United States Patent [19]

Pugh et al.

[11] Patent Number: 4,581,478
[45] Date of Patent: Apr. 8, 1986

[54] GAS PRESSURIZED CABLE AND CONDUIT SYSTEM

[76] Inventors: Paul F. Pugh; Paul Pugh, Jr., both of 33112 Globe Dr., Porterville, Calif. 93257

[21] Appl. No.: 366,172

[22] Filed: Apr. 7, 1982

[51] Int. Cl.[4] .............................................. H01B 9/06
[52] U.S. Cl. .................................. 174/24; 174/25 G; 174/26 G; 174/DIG. 7
[58] Field of Search .................. 174/24, DIG. 7, 256, 174/266

[56] References Cited

U.S. PATENT DOCUMENTS

| | | | |
|---|---|---|---|
| 1,886,786 | 11/1932 | Branthwaite | 174/25 R |
| 1,959,354 | 5/1934 | Everest | 174/24 |
| 2,304,210 | 12/1942 | Scott et al. | 174/24 |
| 3,084,208 | 4/1963 | Palandri et al. | 174/24 |
| 3,143,591 | 8/1964 | Flamand | 174/24 |
| 3,144,499 | 8/1964 | Davey | 174/25 G |
| 3,233,032 | 2/1966 | Crowdes | 174/24 |
| 3,534,132 | 10/1970 | Bailey et al. | 174/DIG. 7 |
| 3,608,710 | 9/1971 | Pugh | 174/10 X |
| 3,613,231 | 10/1971 | Pugh | 174/8 X |
| 3,614,290 | 10/1971 | Plate | 174/26 R |
| 3,621,110 | 11/1971 | McGrath | 174/10 X |
| 3,721,002 | 3/1973 | Pugh | 174/8 X |
| 3,767,838 | 10/1973 | McConnell | 174/25 G |
| 3,773,965 | 11/1973 | Reynolds | 174/25 G |
| 3,862,349 | 1/1975 | Watts | 174/24 X |
| 4,343,665 | 8/1982 | Pugh | 156/48 |

FOREIGN PATENT DOCUMENTS

| | | | |
|---|---|---|---|
| 1515803 | 7/1969 | Fed. Rep. of Germany | 174/24 |
| 973315 | 2/1951 | France | 174/DIG. 7 |
| 36030 | 9/1967 | Japan | 174/24 |
| 1207555 | 10/1970 | United Kingdom | 174/DIG. 7 |
| 1599189 | 9/1981 | United Kingdom | 174/DIG. 7 |

*Primary Examiner*—A. T. Grimley
*Assistant Examiner*—Morris H. Nimmo

[57] ABSTRACT

A way to evacuate all moisture and air and then pressurize with $SF_6$ gas, a cable and conduit system used for electrical power distribution and transmission lines, by fabricating a termination at each end. A termination is made up of a first end plate with a hole slightly larger than the conduit and sealed around the hole to the conduit. For a single phase cable, one electrical terminal is sealed as it goes through the first end plate and is connected to the neutral conductor. A second electrical terminal is sealed as it goes through a second end plate and is connected to the conductor. An enlarged conduit is spaced between these two end plates and is sealed to, the two end plates. A tire valve is installed in one end plate. A hole to fit a pipe nipple is made at the top of the enlarged conduit of one termination. A vacuum pump is connected to a pipe nipple screwed into the hole and the termination evacuated. $SF_6$ gas is then let in through the tire valve until a pressure of 1 psig is reached, then shut off. The vacuum pump and nipple are removed, then a patch is sealed over the hole. $SF_6$ gas is now let in to pressurize at 20–80 psig. Various numbers, sizes and kinds of conductors can be used in a conduit to make various kinds of high voltage power cables.

10 Claims, 10 Drawing Figures

GAS PRESSURIZED CABLE AND CONDUIT SYSTEM

BACKGROUND ART

Electric power cables with extruded insulation over conductors in conduits are used for distribution cables, 5 KV through 35 KV, and for transmission cables, 69 KV through 500 KV. Moisture in the form of water vapor and air enters these cable and conduit systems through the ends of the conduit and by diffusion through the conduit walls. Moisture causes "water treeing" in extruded insulation in a few months, reducing the life of the insulation to approximately one fourth of an expected 30 to 50 year life. Oxygen ages extruded insulation.

Moisture barriers, such as lead or aluminum sheaths, cemented metallic tapes, have been used over extruded insulation in newer installations to prolong their life, but add to the cost of the cable and do not exclude oxygen. Moisture and oxygen can corrode, or otherwise damage, aluminum and aluminum-aluminum and aluminum-copper connections. At a higher cost, extruded insulation compounded with chemical additives has been developed to prolong insulation life in wet locations. Because sodium reacts violently in contact with water, sodium conductors are not practical in the presence of moisture. Should an arc occur in a cable, the presence of oxygen makes the damage due to burning or explosion much greater. The problems caused by moisture and oxygen can be eliminated by evacuating the cable and conduit system to remove all moisture and air, then pressurizing it with an inert gas.

Unpressurized extruded insulated cables in use during recent 10 years were designed with extruded semiconducting materials under and over the insulation to exclude air at the surfaces of the insulation and to prevent ionization at operating voltage. Insulation voids, impurities, non-uniform conducting surfaces, curing ingredients, migration of materials in contact, and mixing ingredients have been a source of ionization which shortens the life of the cable. More recently, very special and expensive manufacturing methods have been developed for extruded insulated cables such as dry curing, gas curing, bonding of semiconducting materials to the insulation by triple extrusion, and special filtering of materials to remove impurities. All of these problems can be eliminated by pressurizing the insulation, conductor, shield, ground, or neutral with a gas at a lower cost.

For energy conservation, very large conductor cables are required which are economical. The present design is a compact segmental conductor or annular conductor, both of which have low skin effect and alternating current losses, but they are very expensive and limited in size. A gas pressurized cable permits the use of bundles of aluminum redraw rods or sodium rods which have little, if any skin effect, and low alternating current resistance.

Several types of gas pressurized cable and conduit systems have been used, one uses an expensive lead sheath and is pulled into a conduit in the field and then sealed. The second type is shown by U.S. Pat. No. 4,343,665 by Pugh, issued Aug. 10, 1982, and uses machine wrapped crepe paper and a gas for insulation with a factory applied conduit.

A gas such as nitrogen or sodium hexaflouride ($SF_6$) has been used to pressurize cable and conduit systems. The voltage required to ionize a gas is proportional to the pressure and the density of the gas and its chemical makeup. $SF_6$ is electronegative gas and is five times the density of nitrogen. The ionization voltage is three to five times that of nitrogen for the same gas pressure. Typically the gas used would be $SF_6$ at a pressure of 20-80 pisg. By using $SF_6$ instead of nitrogen, a lower pressure can be used for the same voltage rating. When the gas in a conduit ionizes it becomes a conductor which can act as a shield and a path for ground fault current which causes the circuit breaker to open the circuit which reduces damage to the conductors and does not damage the insulating properties of the gas.

The life of conventional ("conventional" as used herein means—used before Jan. 1, 1985) cable and conduit systems with extruded insulation and no vapor barrier that have been installed can be lengthened by fabricating the terminations and pressurizing with gas at the site.

Damage to conduits with pressurized gas can be reduced by adding an insect and rodent repellent as the gas that is diffused through the conduit wall helps keep them away.

By pressurizing a conduit with gas, damage to the cable can be reduced or eliminated if a digger pierces the conduit, hears the noise of escaping gas and stops before greater damage can occur.

A leak of gas in the system will cause a pressure drop along the line due to gas flow. By measuring the pressure along the line at splices on both sides of the leak, the location of the leak can be determined.

SUMMARY OF THE INVENTION

This invention relates to gas filled cable and conduit systems with extruded insulations on how to exclude moisture and air by evacuating, then pressurizing with a gas. This can be done at the installation site with cables and conduits that have been installed to increase their life or with new cables being installed. By excluding moisture and air: extruded insulation which is very economical in small sized conductors, can be used with a long life; and problems associated with low cost aluminum and even lower cost sodium conductors can be minimized.

An extruded insulated cable and conduit system is described with an concentric neutral power cable with copper wires for the neutral and ground which is terminated and gas pressurized. An eccentric neutral bars alumium conductor (laid parallel to the power cable) has a power cable without semiconducting materials under and over the insulation.

Aluminum rods, cast or rolled into long lengths, are called redraw rods as they are drawn through dies to make small wires for stranded conductors. They are a lower cost conductor material than stranded wire.

This invention describes how to make a low cost, large conductor, using multiple conductors of aluminum redraw rods or sodium rods for high voltage cables. The rods are laid parallel in bunch stranding with each rod the same length. The individual rod has no skin effect and the bunch has very little, if any, and the proximity effect is very low as the current density is low.

DESCRIPTION OF THE PREFERRED EMBODIMENT

Figure 1:
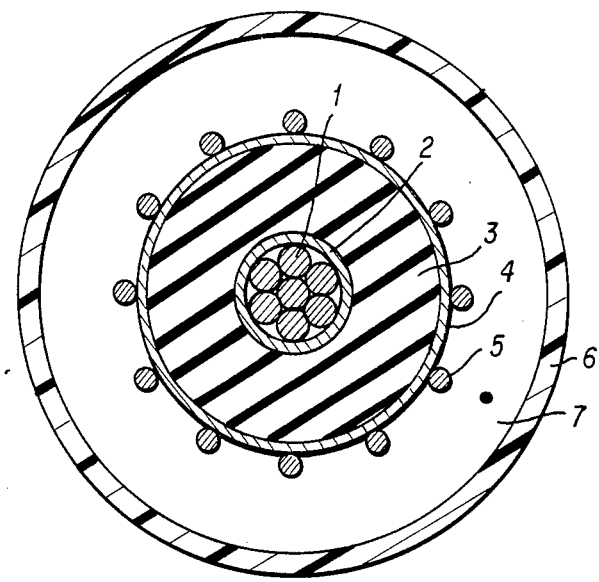
FIG. 1 is cross-section of a gas pressurized, concentric neutral power cable in a conduit.

In the drawings, in FIG. 1, showing a conventional cable, the numeral 1, indicates a central aluminum conductor, with a conductor shield 2, made of an extruded semi-conducting material, surrounding it.

Insulation 3 is extruded over conductor shield 2 and has an insulation shield 4, made of an extruded semi-conducting material, over it. Multiple strands of solid wire, called concentric neutral 5, are evenly spaced around and over, insulation shield 4. Non-metallic conduit 6 is pressurized with gas 7.

Figure 2:
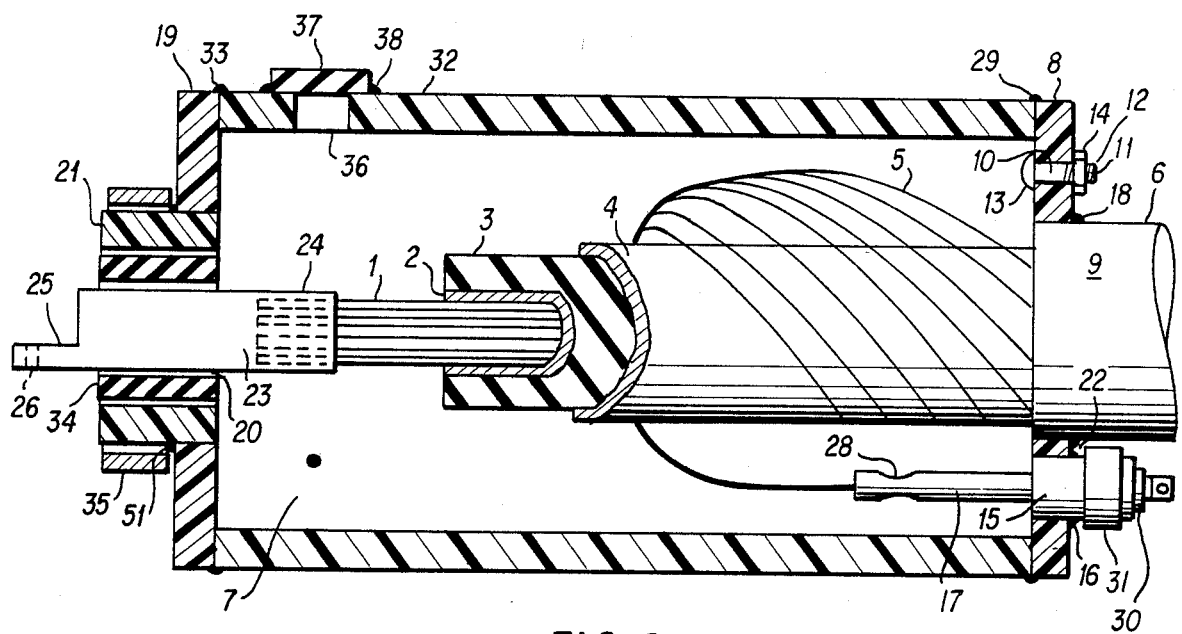
FIG. 2 is a longitudional section of a termination for the cable and conduit shown in FIG. 1.

The termination shown in FIG. 2 permits fabrication at the installation site. A first end plate 8 has three holes; one, 9 slightly larger than conduit 6, a second, 10 slightly larger than stem 11 of tire valve 12, that has a seal 13 and a fastening nut 14, and a third, 15 slighly larger than first sleeve 16. The three holes should be arranged to make tire valve 12, and the terminal 17 accessible when installed and close together to make the outside diameter of first end plate 8 small and still permit the sealing of first end plate 8 to conduit 6. A second end plate 19 has a sleeve hole 20, slightly larger than second sleeve 21. Assemble tire valve 12 in hole 10 of first end plate 8 and seal sleeve 16, which may be a short piece of non-metallic conduit, in hole 15 by weld 22. Place first end plate 8 over conduit 6. Cut conduit 6 to suitably locate the termination in the installation. Unravel the strands of concentric neutral conductor 5 to within an inch from the end of the conduit 6. Cut off the insulation shield 4 a distance equal to one-half inch per thousand volts from end of insulation 3. Cut off insulation 32 and conductor shield 2 a distance to expose conductor 1 to fit into terminal 23. Terminal 23 has a solid copper or aluminum barrel to fit seal 34 and hole in one end to fit conductor 1 which is fastened by crimp 24. The other end of the terminal 23 is adapted for connecting leads to, for example, by flat blade 25 and hole 26. Terminal 17 may be identical to terminal 23. Cut off the strands of concentric neutral conductor 5 so they will not reach insulation 3, then fasten the conductor to terminal 17 by crimp 28. Seal first end plate 8 to conduit 6 by weld 18. Terminal 17 is brought out of the termination by putting terminal 17 into sleeve 16 and sealing by installing rubber-like tube 30 and band clamp 31. Position second end plate 19 on terminal 23, measure between end plates 8 and 19, then cut enlarged conduit 32, which should have the same outside diameter as end plates 8 and 19, to this length. Align hole 20 of second end plate 19 with hole 9 of first end plate 8, then seal enlarged conduit 32 to second end plate 19 by weld 33 and to end plate 8, by weld 29. Seal sleeve 21 to end plate 19 by weld 51. Typically conduits 6 and 32, end plates 8 and 19, and sleeves 16 and 21, would all be made of one plastic like material which can be sealed to withstand continuous operating pressures of 80 80 psig and temperatures of 75 Centigrade. Sleeve 21, end plate 19 and enlarged conduit 32 could be molded in one piece, as could sleeve 16 and end plate 8, to reduce parts and installation cost. Terminal 23 is brought out of the termination by inserting a seal, a rubber-like tube 34, into sleeve 21 and fastening with a band clamp 35.

At some installations the length of sleeve 21 can be extended several feet to reach a terminal block which is remote from the end of the conduit 6. The insulation 3 and conductor shield 2 would then be cut back or removed several feet and terminal 23 would be located remote from termination. After a termination is made at each end of the conduit, with only one needing a tire valve 12, the table and conduit system is ready to evacuate and pressurize with gas.

One method is to drill a hole 36 through the top of enlarged conduit 32, slightly smaller than the end of a one-half inch NPT pipe nipple, then screw in the nipple. Attach one end of hose to the nipple and the other end to a vacuum gage through a vacuum shut-off valve to a vacuum pump. Attach one end of a hose to tire valve 12 and the other end to a pressure gage, through a gas shut-off valve to a source of $SF_6$ gas under pressure. With the gas shut-off valve closed, turn the vacuum pump on, open the vacuum shut-off valve and when the conduit and termination system is completely evacuated, open the gas valve and close the vacuum valve. When the pressure reaches one psig, close the gas valve. Remove the pipe nipple in hole 36 and seal hole 36 by heat fusion by patch 37 and weld 38. Because $SF_6$ gas is five times denser than air, the gas acts like a liquid and keeps out air during the the sealing of hole 36. If the projection of patch 37 on enlarged conduit 32, is objectionable, a plug 39, FIG. 4, can be used. Conduit 6 is then pressurized to desired pressure by tire valve 12.

The terminations shown in FIGS. 2, 4, 6, and 8 can be used to splice cable and conduit systems. Two terminations joined in a splice.

The cable, conduit, and termination shown in FIG. 2 is used for a typical single phase circuit for high voltage residential underground distribution to feed padmount transformers. For a three phase circuit, the construction would be similar except second end plate 19, would have three terminals 23, and seals and there would be three cables instead of one in conduit 6. The three cables may have shielding tapes instead of wires which would be connected together and removed through sleeve 16 as a ground connection. If three concentric neutral cables were used for a three phase circuit, the three concentric wires would be joined and removed through sleeve 16. The fabrication, evacuation, and gas pressurization of the terminations shown in FIGS. 2, 4, 6, and 8 are similar.

Figure 3:
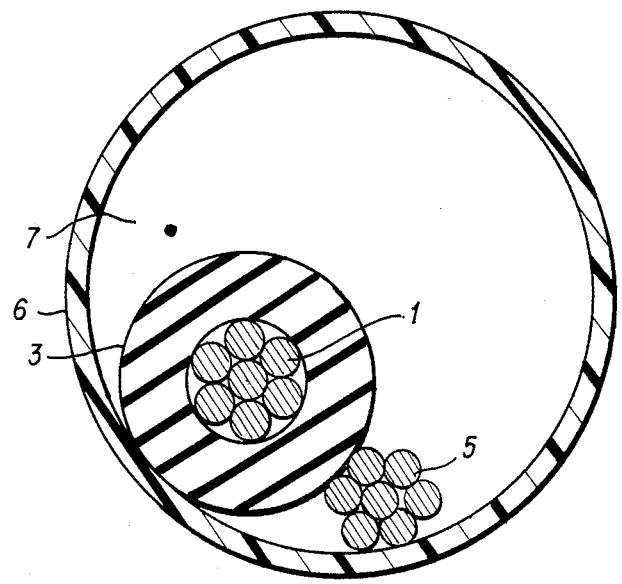
FIG. 3 is a cross-section of an eccentric neutral power cable in a conduit with gas pressure.
Figure 4:
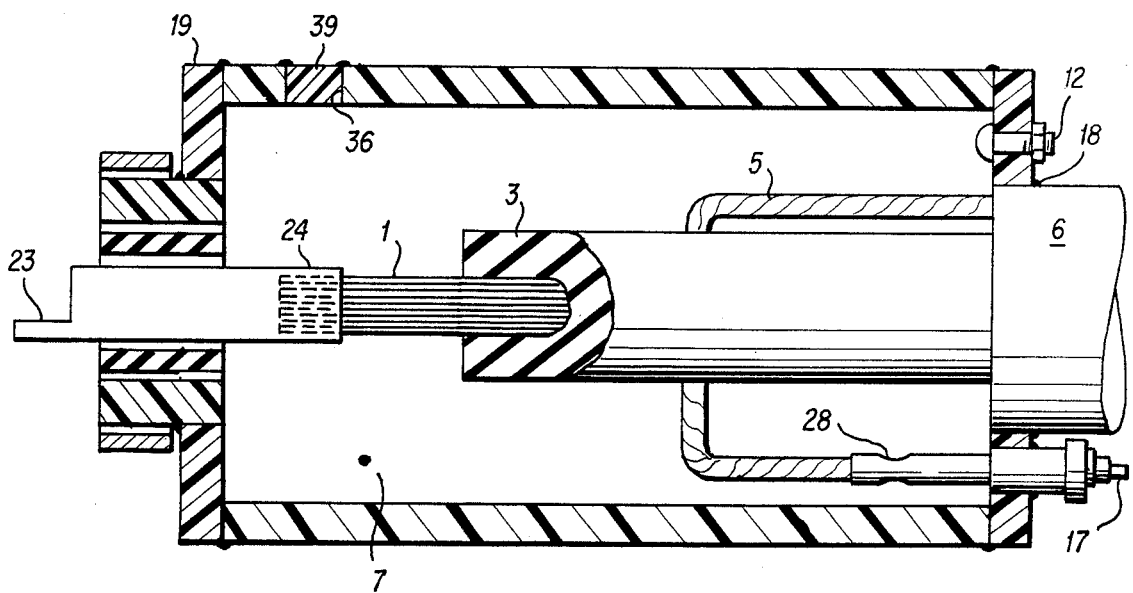
FIG. 4 is a longitudinal section of a termination for the cable and conduit shown in FIG. 3.

In FIGS. 3 and 4, an aluminum conductor 1, with extruded insulation 3 over it, has a bare aluminum neutral conductor 5, of equal size, laid in parallel to form a single phase eccentric neutral cable. The conductors would be solid aluminum for small conductor sizes and bundles of aluminum redraw rod for larger conductors. A cable can include a variety of numbers, sizes, and kinds of conductors in conduit 6 pressurized with gas 7.

Figure 5:
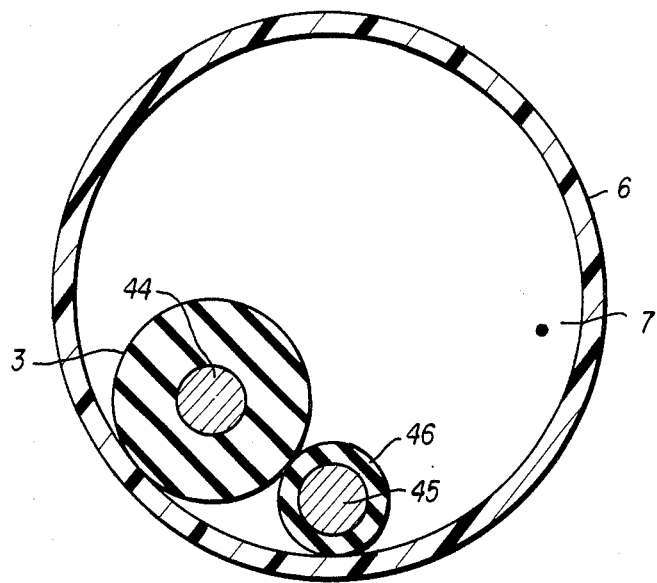
FIG. 5 is cross-section of an eccentric neutral power cable using sodium conductors in conduit with gas pressure.

In FIG. 5, a sodium conductor 44, with extruded insulation 3 and a sodium eccentric neutral conductor 45 is used. A thinner extruded insulation 46 is used over 45. Because 46 is used primarily to mechanically strengthen 45, it can be made of a lower cost reclaimed material. Similarly, insulation 3 when pressurized with a gas can be a lower cost material.

Conductors are listed in order of decreasing cost for the same conductivity: copper, drawn aluminum, aluminum redraw rod, and sodium.

Figure 6:
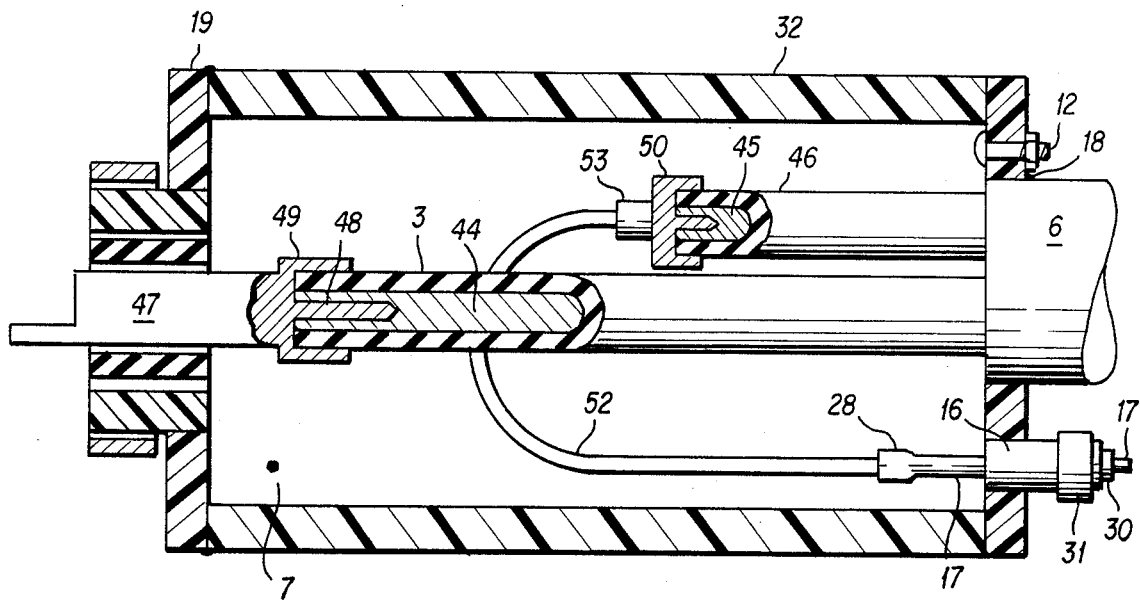
FIG. 6 is longitudinal section of a termination for the cable and conduit shown in FIG. 5.

In FIG. 6, a terminal 47 has a conventional connection to a sodium conductor 44. A tapered, blade-like probe 48 is pushed into the sodium conductor 44 which is 'cheese-like' in structure with a cylindrical portion 49, of terminal 47, fitted closely over insulation 3. The neutral conductor 45 is brought out of the termination by connector 50, crimp 53, lead 52, crimp 28, and terminal 17, which is sealed by tube 30, sleeve 16 and clamp 31. Connector 50 is fastened to neutral conductor 45 and insulation 46, like terminal 23 is to conductor 44 and insulation 3, respectively.

Figure 7:
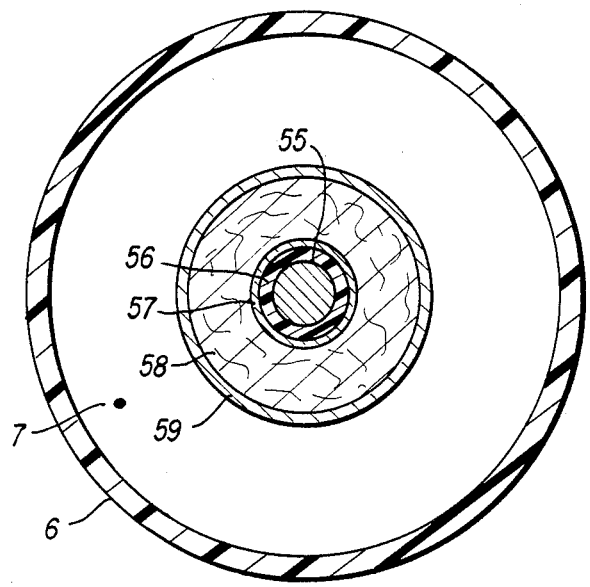
FIG. 7 is a cross-section of a cable and conduit using a shielded cable with a sodium conductor and crepe paper with gas pressure.

FIG. 7, shows a single conductor high voltage cable with a large solid sodium conductor 55, that is covered by a thin, non-metallic, insulating pipe 56. Over 56 is a conductor shield 57, which is made of aluminum backed crepe paper tape or an aluminum tape and is used to reduce voltage stress. Over shield 57 is crepe paper tape insulation 58, and a thickness suitable for the voltage. Insulation shield 59, is similar to shield 57, covers insulation 58. Conduit 6 is pressurized with gas 7.

Figure 7A:
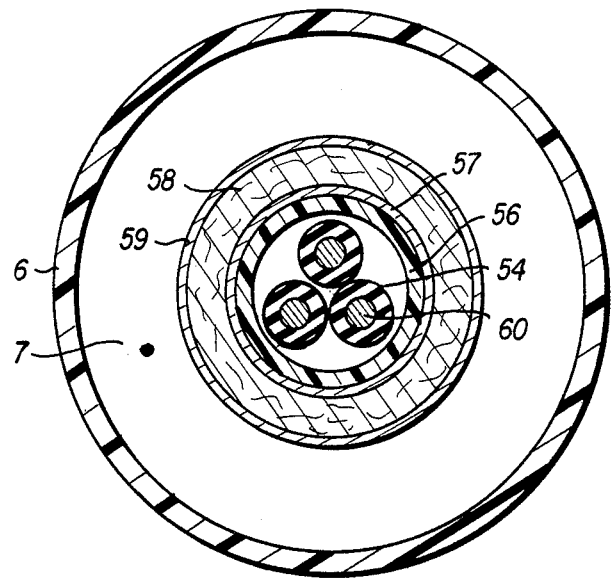
FIG. 7A is a cross-section of a cable and conduit with multiple rods of sodium for a conductor inside a non-metallic pipe and similar to FIG. 7.

FIG. 7A shows the same construction as shown in FIG. 7. While only three sodium rods 60 are shown for the conductor of a single conductor cable, more than five hundred can be connected in parallel to form a large single conductor. The terminal for a large number of sodium rods, used as a single conductor, would have a corresponding number of probes 48.

Figure 7B:
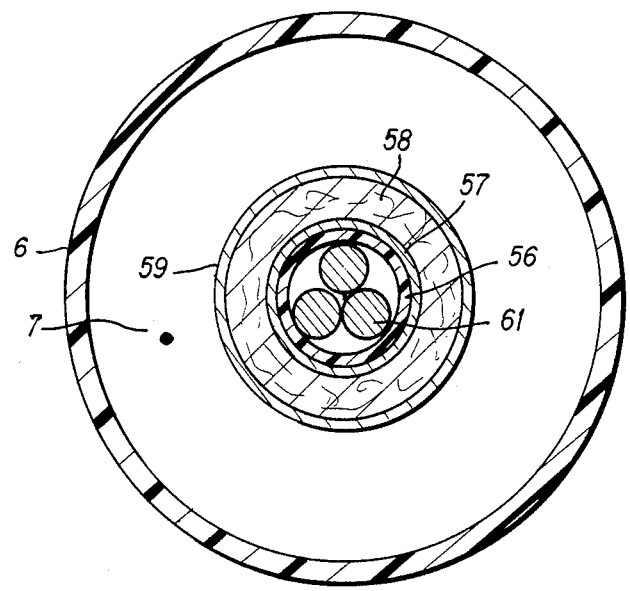
FIG. 7B is a cross-section of a cable and conduit similar to FIG. 7A except the conductor is composed of three aluminum redraw rods inside a non-metallic pipe.

FIG. 7B shows a cable similar to that shown in FIG. 7A, except that in place of three sodium rods 60, three bare, aluminum redraw rods 61, are used. Multiple aluminum redraw rods, used as a single conductor, would be crimped together in the terminal.

Figure 8:
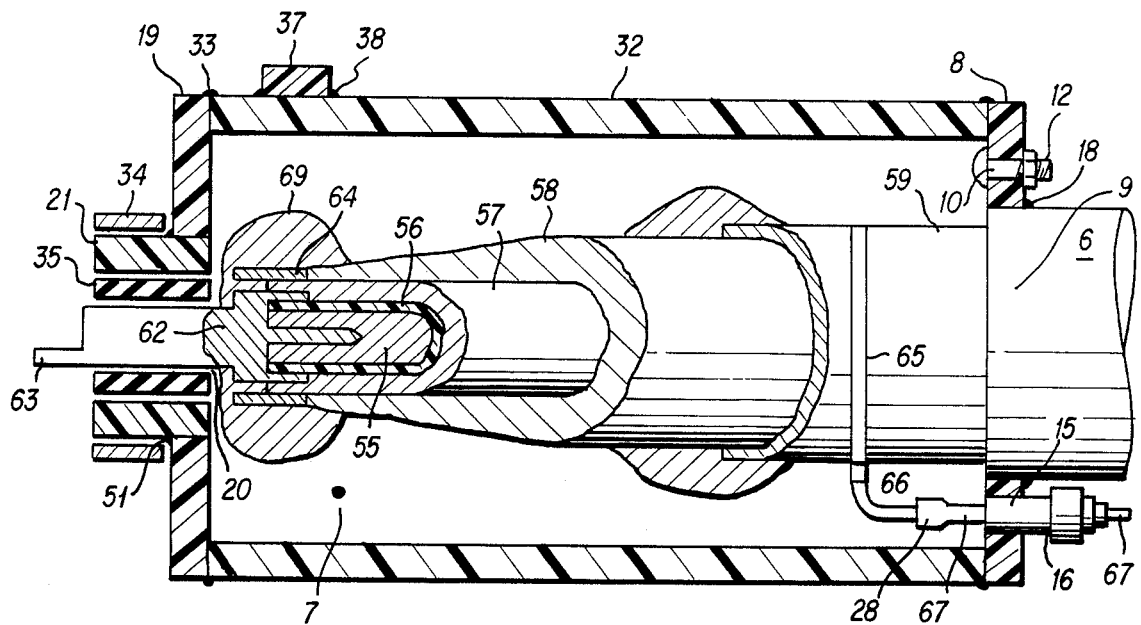
FIG. 8 is a longitudinal section of a termination for the cable and conduit shown in FIG. 7.

FIG. 8 shows a termination for the cable shown in FIG. 7. A similar termination would be used for the cable shown in FIGS. 7A and 7B. The conductor shield 57 is connected to the conductor 55, at each end, by lapping shield 57 over terminal end 62 of terminal 63, then clamping shield 57 to 62 with stainless steel band clamp 64 which is non-magnetic. The insulation shield 59 is cut back one-half inch per 1000 volts, from the end of the insulation 58, then a stainless steel banding clamp 65 is used to clamp one end of a flexible lead 66 going around 59. The other end of lead 66 is attached to terminal 67 by crimp 28. Hand applied crepe paper tape insulation 69 and 70, covers clamp 64 and the end of insulation shield 59, respectively.

Voltage stress on a conductor increases as the radius of that conductor decreases. By laying multiple sodium rods or aluminum redraw rods in parallel, in insulation pipe 56, see FIG. 7A, with a conductor shield 57 over pipe 56 and with conductor shield 57 connected to conductors 60 at each end, the voltage stress is greatly reduced, so the cable can operate at a higher voltage or less insulation thickness can be used. When multiple rods are laid in parallel in pipe 56, the conductors can move when the conduit is bent.

New methods shown relate to using gas pressure to make and terminate verious extruded insulated cables and crepe paper insulated cables of various types, sizes, and confiigrations for delivering high voltage electrical energy economically and with low losses. It is within the contemplated scope of this invention that numerous changes and variations can be made in the methods and materials without departing from the intended scope of the invention. Cable can be factory-built and terminated or field terminated. Conduit and cable can be factory or field assembled.

I claim:

1. A pressurized electric power cable and conduit system comprising:
   a power cable comprising:
   a central conductor (1); and
   a neutral conductor (5);
   an insulating conduit (6) over said cable with a portion of said cable extending beyond both ends of said insulating conduit for a termination;
   a termination attached to at least one end of said insulating conduit with said termination comprising:
   a short length of an enlarged insulating conduit (32);
   a first conduit end plate (8) sealed to one end of said enlarged insulating conduit, said first plate having a first hole (9) slightly larger than said insulating conduit;
   a second conduit end plate (19) sealed to the other end of said enlarged insulating conduit and said second plate having a second hole (20) into which the end of a small insulating conduit (21) is inserted and sealed to said second plate, a seal (34) inserted within the small insulating conduit, and a clamp (35) over said small insulating conduit;
   a terminal (23) for attaching to said central conductor;
   a means (17) to bring said neutral conductor out of said termination;
   a means (36) through which said termination and said insulating conduit can be evacuated;
   a means (12) through which said termination and said insulating conduit can be pressurized; an insulating gas (7) within the said termination and said insulating conduit;
   at each end of said insulating conduit said cable extending through said first hole in said first end plate into said termination, the end of said insulating conduit sealed at (18) at the said hole of said first plate;
   said terminal attached to the end of said central conductor and inserted inside said seal (34), said clamp (35) arranged to form a seal around said terminal, and said neutral conductor attached to a means to bring said neutral conductor out of said termination.

2. A pressurized electric power cable and conduit system according to claim 1, with said gas being an electro-negative, high density gas.

3. A pressurized electric power cable and conduit system according to claim 1, wherein said neutral conductor is a concentric neutral conductor.

4. A pressurized electric power cable and conduit system according to claim 1 wherein said neutral conductor is an eccentric neutral conductor.

5. A pressurized electric power cable and conduit system according to claim 4, wherein said central conductor is a sodium central conductor and said eccentric neutral conductor is an eccentric sodium neutral conductor.

6. A pressurized electric power cable and conduit system comprising:
a power cable comprising:
a conductor (55);
an insulating pipe (56) over said conductor;
a conductor shield (57) over said insulating pipe;
a crepe paper tape insulation (58) over said conductor shield; and an insulation shield (59) covering said paper tape insulation;
an insulating conduit (6) over said power cable with a portion of said cable extending beyond both ends of said insulating conduit for a termination;
a termination attached to at least one end of said insulating conduit with said termination comprising:
a short length of an enlarged insulating conduit (32);
a first end plate (8) sealed at (18) to one end of said enlarged conduit, said first end plate having a first hole 9 slightly larger than said enlarged insulating conduit;
a second end plate (19) sealed at (33) to the other end of said enlarged insulating conduit and having a second hole (20) and insulating sleeve (21) sealed at (51) to said second end plate;
a first terminal (63) attached to said conductor;
a means to bring said first terminal out of said termination comprising:
a means to seal (35) said first terminal;
an insulating sleeve (21) being clamped by said means to seal (35) said first terminal;
a second terminal (67) attached to said insulation shield;
a means to bring said second terminal out of said termination comprising:
a flexible lead (66) having one end attached to said second terminal and the other end attached to the said insulation shield (59);
a means (65) to connect said flexible lead to said insulation shield (59);
a means (16) to seal said second terminal;
a said second insulating sleeve (16) having said means to seal said second terminal;
a means (37) through which said termination and said insulating conduit (6) can be evacuated and;
a means (12) through which said termination and insulating conduit (6) can be pressurized; an insulating gas (7) within said termination and insulating conduit;
at least one end of said insulating conduit, said cable extending through the said first hole (9) in said first end plate into said termination;
the end of said conduit sealed at said first hole of said first end plate.

7. A pressurized electric power cable and insulating conduit system according to claim 6, wherein said conductor is a sodium conductor.

8. A pressurized electric power cable and insulating conduit system according to claim 6, wherein said conductor is made up of multiple sodium rods.

9. A pressurized electric power cable and insulating conduit system according to claim 6, wherein said conductor is made up of multiple aluminum redraw rods (61).

10. A pressurized electric power cable and insulating conduit system according to claim 6, with said insulating gas being an electro-negative, high density gas.

* * * * *